United States Patent
Johnson

(10) Patent No.: US 12,489,828 B1
(45) Date of Patent: Dec. 2, 2025

(54) MESSAGING CLIENT, DATA BROKER AND METHODS

(71) Applicant: HiveMQ GmbH, Landshut (DE)

(72) Inventor: Simon Johnson, Bournemouth (GB)

(73) Assignee: HiveMQ GmbH, Landshut (DE)

( * ) Notice: Subject to any disclaimer, the term of this patent is extended or adjusted under 35 U.S.C. 154(b) by 0 days.

(21) Appl. No.: 18/999,165

(22) Filed: Dec. 23, 2024

(30) Foreign Application Priority Data

May 29, 2024 (GB) ...................... 2407628

(51) Int. Cl.
*H04L 12/24* (2006.01)
*H04L 41/0803* (2022.01)
*H04L 67/55* (2022.01)
*H04L 67/562* (2022.01)

(52) U.S. Cl.
CPC ............ *H04L 67/55* (2022.05); *H04L 67/562* (2022.05)

(58) Field of Classification Search
CPC .............................. H04L 67/55; H04L 67/562
USPC ......................................................... 709/203
See application file for complete search history.

(56) References Cited

U.S. PATENT DOCUMENTS

| | | | |
|---|---|---|---|
| 2003/0115317 A1* | 6/2003 | Hickson | H04L 67/563 709/239 |
| 2003/0135556 A1 | 7/2003 | Holdsworth | |
| 2010/0306365 A1* | 12/2010 | Gale | H04L 51/214 709/224 |
| 2012/0117172 A1* | 5/2012 | Hickson | H04L 67/306 709/206 |
| 2014/0012892 A1* | 1/2014 | Jaudon | H04L 67/10 709/203 |

(Continued)

FOREIGN PATENT DOCUMENTS

| | | | |
|---|---|---|---|
| CN | 114244914 B | 5/2024 | |
| WO | WO-2024130157 A1 * | 6/2024 | ........... A61B 5/4836 |

OTHER PUBLICATIONS

OASIS MQTT Version 3.1.1 Plus Errata 01 OASIS Standard Incorporating Approved Errata 01, Dec. 10, 2015.
OASIS MQTT Version 5.0 OASIS Standard, Mar. 7, 2019.
MQTT For Sensor Networks (MQTT-SN) Protocol Specification Version 1.2 Andy Stanford-Clark and Hong Linh Truong, May 20, 2011.

(Continued)

*Primary Examiner* — Moustafa M Meky
*Assistant Examiner* — Elizabeth Kassa
(74) *Attorney, Agent, or Firm* — EIP US LLP

(57) ABSTRACT

A method comprises receiving first sensor data for publication and establishing a first connection with the data broker in accordance with a first publish/subscribe messaging protocol, wherein the establishing comprises transmitting a connection request packet comprising an identifier of the sensor client via a first wireless communications network. The method also comprises publishing first sensor data to the data broker in accordance with the first publish/subscribe messaging protocol using the first connection, receiving second sensor data for publication, and determining that criteria for using a second publish/subscribe messaging protocol. A second connection with the data broker is established in accordance with the second publish/subscribe messaging protocol, wherein the establishing comprises transmitting a second connection request packet comprising the identifier of the sensor client, and the second sensor data is published to the data broker in accordance with the second publish/subscribe messaging protocol using the second connection.

17 Claims, 8 Drawing Sheets

(56) References Cited

U.S. PATENT DOCUMENTS

| | | | |
|---|---|---|---|
| 2015/0373482 A1* | 12/2015 | Barnard | H04W 4/40 |
| | | | 370/338 |
| 2017/0093857 A1* | 3/2017 | Hinohara | G06F 21/335 |
| 2017/0149755 A1* | 5/2017 | Soneda | H04L 63/10 |
| 2018/0007172 A1* | 1/2018 | Wang | H04L 67/54 |
| 2018/0167476 A1 | 6/2018 | Hoffner et al. | |
| 2019/0097962 A1* | 3/2019 | Young | H04L 51/224 |
| 2020/0021586 A1* | 1/2020 | Schmidt | H04L 63/20 |
| 2020/0028946 A1* | 1/2020 | Vora | H04L 1/1874 |
| 2020/0287974 A1* | 9/2020 | Gnessin | H04L 67/142 |
| 2023/0008728 A1* | 1/2023 | Zhang | H04L 67/55 |
| 2023/0092015 A1* | 3/2023 | Schmidt | H04L 63/10 |

OTHER PUBLICATIONS

OASIS OPEN MQTT for Sensor Networks (MQTT-SN) Version 2.0 Committee Specification Draft 01, Dec. 7, 2023.

"OPTIMUM OPTimised Industrial IoT and Distributed Control Platform for Manufacturing and Material Handling Evaluation of IoT-platform and Definition of the IIoT-platform Architecture", pp. 1-98, Varutti Paolo, et al. Feb. 6, 2019.

UKIPO Combined Search and Examination Report dated Feb. 5, 2025 for GB Application No. GB2407628.3.

Varutti Paolo et al: "OPTIMUM OPTimised ndustrial IoT and Distributed Control Platform for Manufacturing and Material Handling Evaluation of IoT-platforms and Definition of the IIoT-platform Architecture", Feb. 1, 2019 (Feb. 1, 2019), pp. 1-98, XP055830486.

Extended European Search Report dated Sep. 3, 2025 for European Patent Application No. 25168123.5.

* cited by examiner

MESSAGING CLIENT, DATA BROKER AND METHODS

CROSS-REFERENCE TO RELATED APPLICATIONS

This application claims priority to GB Application No. GB 2407628.3, filed May 29, 2024, under 35 U.S.C. § 119 (a). The above-referenced patent application is incorporated by reference in its entirety.

TECHNICAL FIELD

The present disclosure relates to the operation of a client and data broker in a publish/subscribe messaging system.

BACKGROUND

In order to coordinate the communication of data between numerous data sources and entities which make use of that data, a data broker may act as an intermediary in a publish/subscribe architecture by maintaining a record of subscriber clients who wish to receive data transmitted by publisher clients. The data may be, for example, sensor data generated at a remote device. The use of a data broker can produce a faster and more efficient communication system, by eliminating the need for direct communication between the publisher and subscriber clients.

A feature of a publish/subscribe architecture is that a publisher client may not be aware of the identity, or even existence of any subscriber client which has established a connection for its published data. Similarly, a subscriber client does not have to manage point-to-point transmissions from each publisher client that it wishes to receive data from.

A single broker may handle publisher clients which are very diverse. Some publisher clients may be permanently connected to a source of electricity (e.g. a distribution grid) and may have wired network connections (e.g. via digital subscriber line, DSL, technology, or optical fibre) for maintaining high bandwidth connectivity with the data broker. Other publisher clients may be constrained in some manner, for example having access only to limited power, to limited bandwidth for transmitting and receiving data and/or to limited processing capabilities.

Different messaging protocols may be provided to accommodate the respective constraints applicable to different publisher clients. Each protocol enables data from different publishing clients to be processed similarly at the broker, transparently to the subscriber clients.

SUMMARY

According to a first aspect, there is provided a computer-implemented method performed at a sensor client. The method comprises receiving, via a messaging interface, first sensor data for publication, and establishing a first connection with the data broker in accordance with a first publish/subscribe messaging protocol, wherein the establishing comprises transmitting a connection request packet comprising an identifier of the sensor client via a first wireless communications network. The method also comprises publishing first sensor data to the data broker in accordance with the first publish/subscribe messaging protocol using the first connection via the first wireless communications network using a connection-oriented transport protocol, receiving, via the messaging interface, second sensor data for publication, and determining that criteria for using a second publish/subscribe messaging protocol in preference to the first publish/subscribe messaging protocol are satisfied. A second connection with the data broker is established in accordance with the second publish/subscribe messaging protocol, wherein the establishing comprises transmitting a second connection request packet comprising the identifier of the sensor client, and the method comprises publishing the second sensor data to the data broker in accordance with the second publish/subscribe messaging protocol using the second connection via a second wireless communications network using a connectionless transport protocol.

There is also provided a further computer-implemented method performed at a broker. Also provided is a sensor client apparatus and data broker apparatus configured to perform the computer-implemented methods. Also provided is computer program product (such as one or more non-transient storage media) comprising instructions to perform the computer-implemented method.

By switching between messaging protocols, an appropriate protocol can be selected in response to variations experienced by a client it its ability to transmit and receive data over time.

Further features and advantages will become apparent from the following description of preferred embodiments of the invention, given by way of example only, which is made with reference to the accompanying drawings.

DETAILED DESCRIPTION

Details of systems and methods according to examples will become apparent from the following description with reference to the figures. In this description, for the purposes of explanation, numerous specific details of certain examples are set forth. Reference in the specification to 'an example' or similar language means that a feature, structure, or characteristic described in connection with the example is included in at least that one example but not necessarily in other examples. It should be further noted that certain examples are described schematically with certain features omitted and/or necessarily simplified for the ease of explanation and understanding of the concepts underlying the examples.

Embodiments of the present disclosure relate to the transmission of packets between a client and data broker in a publish/subscribe system. In particular, embodiments described herein address problems related to a change of circumstance or conditions of a client.

Figure 1:
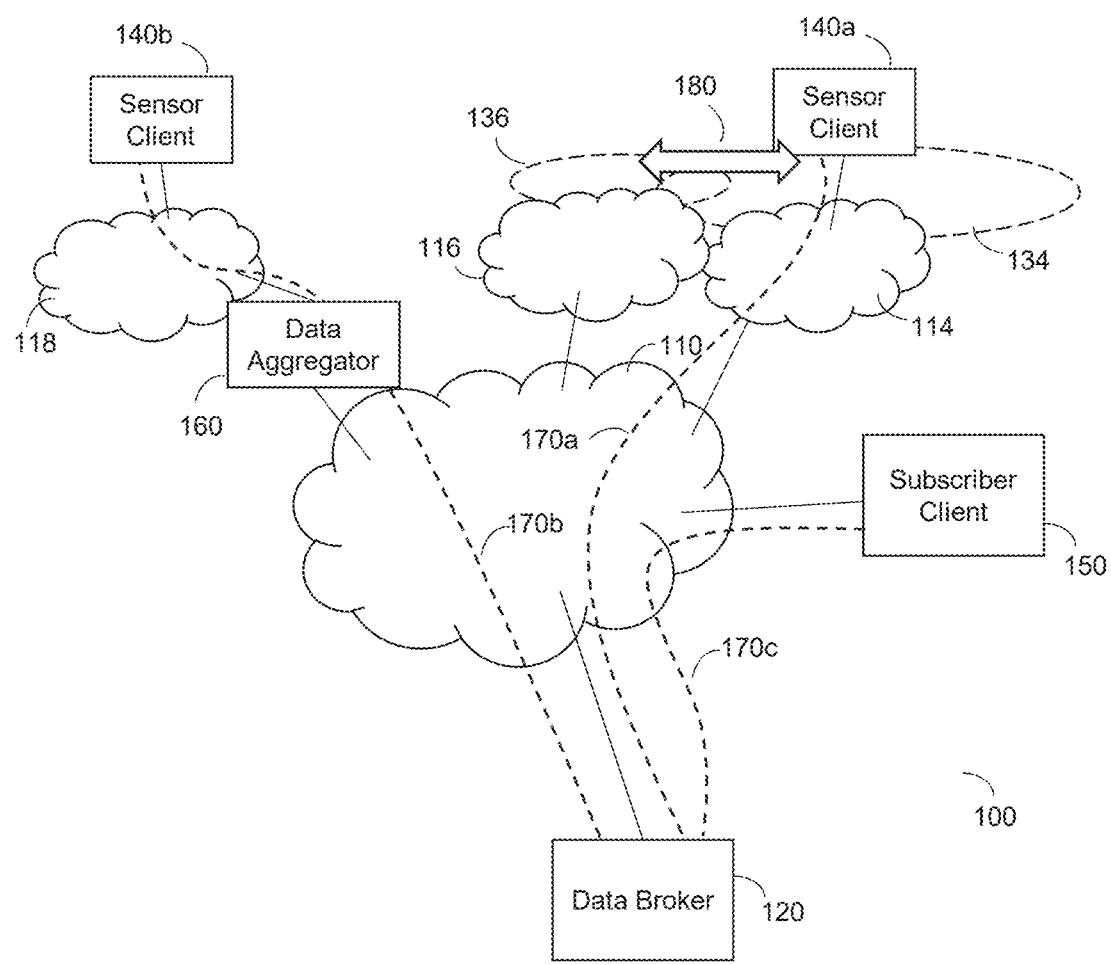
FIG. 1 shows a network architecture within which examples may be implemented.

FIG. 1 shows a network architecture 100 within which examples of the present disclosure may be implemented.

The network architecture 100 includes a first communications network 110, which connects a data broker 120, and clients 140a, 140b, 150. Certain clients 140a-b generate data which is transmitted (or 'published') to the data broker 120. Examples of such clients are sensor devices, measuring devices, or other sources of sensor data. These 'sensor clients' 140a, 140b may be Internet-of-Things devices. The sensor data may be machine-type communication (MTC) data.

The system illustrated in FIG. 1 is an example of a 'publish/subscribe' architecture. That is, the data broker 120 may receive data which has been published (that is, transmitted towards the data broker 120) by the sensor clients 140 and forward it to any subscriber client 150 which has subscribed to receive that data. A subscriber client 150 may subscribe to receive certain data by sending a 'SUBSCRIBE' control packet to the data broker 120, indicating a scope of a subscription. Published data may be associated with a particular topic, and the scope of a subscription may be defined by one or more topics, one or more sensor clients, or a combination of these.

A subscriber client 150 thus receives data, such as sensor data published by sensor clients 140a, 140b, from the data broker 120, if the sensor data is within the scope of a subscription of the subscriber client. A client may both transmit data towards the data broker 120 and receive data from the data broker 120. Such a client is both a subscriber client and a sensor client.

The use of a publish/subscribe architecture may avoid the need for subscriber clients to connect to each sensor client of interest, can reduce transmissions over the communications networks, and can simplify the implementation (with accordingly reduced processing requirements) for sensor clients and subscriber clients.

In the example of FIG. 1, sensor client 140a connects directly to the data broker 120 via first communications network 110 and second communication network 114, while another sensor client 140b connects indirectly, via a fourth communications network 118 and a data aggregator 160. The data aggregator 160 is connected to the data broker 120 via the first communications network 110. A subscriber client 150 connects to the data broker 120 via the first communications network 110.

The communications networks 110, 114, 116, 118 may each comprise one or more different physical networks which are interconnected. For example, and without limiting the scope of the present disclosure, the first communications network 110 may include the public internet, and one or more local area networks to which the data aggregator 160, subscriber client 150 and data broker 120 are directly connected.

In the example of FIG. 1, second communications network 114 and third communications network 116 are wireless communications networks, operating according to a cellular wireless communications specification, such as in accordance with the 3GPP 2G (GSM/GPRS/EDGE), 3G (UMTS), 4G (LTE) or 5G (NR) standards or in accordance with a local area or personal area wireless communications network, such as in accordance with an IEEE 802.11 standard, a Bluetooth standard, or a Zigbee. The second communications network 114 may use the same or different technologies as the third communications network 116.

The fourth communications network 118 may be particularly suitable for highly constrained devices and may accordingly use a suitable communications protocol such as Zigbee or Bluetooth.

Accordingly, sensor clients 140a, 140b, comprise wireless communications functionality, such as radio frequency transceivers, and one or more antennae.

The first communications network 110, second communications network 114 and third communications network 116 interoperate to provide end-to-end connectivity, for the transport of internet protocol (IP) packets according to the IP version 4 or IP version 6 specifications or other suitable standard, between the data broker 120 and each of the sensor client 140a, subscriber client 150 and the data aggregator 160. This end-to-end connectivity may be in part provided by the internet.

However, third communications network 116 and fourth communications network 118 may differ in their ability to support transmissions of data between a connected sensor client and the data broker 120. For example, third communications network 116 may be operated specifically for MTC-type communications, supporting only low-bandwidth transmissions. Transmission latency may be much higher for communications via the third communications network 116 than via the second communications network 114. The use of TCP may not be feasible, or may be prohibited, for communications via the third communications network 116.

References to particular standards or specifications herein are not intended to be limiting and it will be appreciated that the examples of the present disclosure may be implemented in accordance with any suitable standards, including ones which are developed in the future.

The data aggregator 160 is connected to both the first communications network 110 and the fourth communications network 118 and operates to allow data to be transmitted between the sensor client 140b and the data broker 120.

It is to be understood that the arrangement of sensor clients, subscriber clients and data brokers shown in FIG. 1 is for the purpose of illustration without suggesting any limitations. There may be fewer, or more, sensor clients, subscriber clients and data brokers than are shown in FIG. 1. Similarly, the network topology is for illustration, and in some examples, there may be fewer than, or more than four communications networks. In some cases, there may be a direct connection between entities. For example, the data aggregator 160 may be connected directly to the data broker 120 by a point-to-point link.

The data broker 120 transmits and receives control packets, directly or indirectly, to sensor clients and to subscriber clients. These control packets may be transmitted in accordance with a publish/subscribe messaging protocol. These protocols may operate in a connection-oriented manner: that is, the messaging protocol may provide the concept of a logical connection between a client and the broker, via which control packets may be transmitted. The protocol may define certain control packets (such as a 'CONNECT' control packet) to enable the establishment, maintenance and termination of these logical connections. In the example of FIG. 1, sensor client 140a is connected via logical connection 170a and subscriber client 150 is connected to the data broker 120 via logical connection 170c. Data aggregator 160 acts as an intermediary for sensor client 140b which operates in a highly constrained environment. Accordingly, a logical connection 170b for transmitting and receiving data between sensor client 140b and data broker 120 is formed, in effect, by the concatenation of a connection between the sensor client 140*b* and the data aggregator 160 and a connection between the data aggregator 160 and the data broker 120.

The transmission of data ('publishing') and associated control signalling (which may relate to, for example, subscription requests, connection requests, disconnection requests, and unsubscribe requests) may be in accordance with a suitable protocol or standard. In a particular example, the protocol may be selected from one of the following variants of MQTT:
1. MQTT—this variant includes versions 3.x and 5.x and is generally referred to as herein as MQTT.
2. MQTT-SN (MQTT For Sensor Networks)—this variant includes versions 1.2 and 2.0 and is referred to herein as MQTT-SN.

Each variant is designed and optimized for different networking environments and transports. In the absence of any constraints, MQTT deployed across transmission control protocol (TCP) over internet protocol (IP) transport (often using transport layer security, TLS) is preferable as it can provide fault tolerance, lower latencies and better network presence. In contrast, MQTT-SN is designed to be used with "connectionless" transports such as UDP, suitable for being deployed in more constrained network environments, for example using a 3GPP narrowband internet of things (NB-IoT) or non-terrestrial network (NTN) communications network, where bandwidth and maximum transmission unit (MTU) size restrictions apply, and/or where TCP/IP may be impractical or prohibited.

MQTT-SN can use less power and bandwidth than MQTT operating over TCP/IP, but because UDP is "connectionless", there may be increased levels of packet loss and latency compared with MQTT operating over TCP/IP.

Both variants define various control packet formats. One such format is a 'PUBLISH' format, for publishing data messages. Other formats include SUBSCRIBE and CONNECT formats.

In the example of FIG. 1, third and fourth communications networks 116, 118 do not support (or are otherwise unsuitable for) the maintenance of TCP/IP connections. Accordingly, a sensor client wishing to connect to a data broker via these networks must use MQTT-SN, rather than MQTT.

Clients connecting via the third network 116 connect directly to the data broker 120 using MQTT-SN. Accordingly, the data broker 120 may be an SN-enabled MQTT broker (that is, a broker which supports both MQTT and MQTT-SN connections) or may comprise an MQTT-SN embedded gateway combined with an MQTT server.

Clients, such as the sensor client 140*b*, connecting via the fourth network 118 connect initially to the data aggregator 160 using MQTT-SN. The data aggregator 160 then establishes a corresponding MQTT connection to the data broker 120, thus allowing end-to-end communication between the sensor client 140*b* and the data broker 120. Accordingly, the data aggregator may function as an MQTT-SN gateway.

MQTT and MQTT-SN provides certain quality of service (QoS) options for the delivery of a message. Herein, 'message' is used to refer to data published by a sensor client towards the data broker or by the data broker towards a subscriber client. A message may comprise or be associated with an indication of a topic associated with the data. QoS level 0 ('QoS 0') provides for message delivery to occur at most once. This can be considered a 'best effort' QoS. Messages transmitted with QoS level 1 ('QoS 1') are to be delivered at least once to the receiver. This requires the transmitter to keep a copy of the message until the receiver has confirmed that it has received the message. QoS level 2 ('QoS 2') provides for exactly once delivery of the message. This requires additional state and signalling, and therefore incurs greater signalling and processing overhead than QoS 0 or QoS 1 transmissions.

In general, many client devices, such as sensor client 140*b*, are stationary and operate in static environmental conditions. For these client devices, a decision as to whether to use a first messaging protocol (such as MQTT) or a second messaging protocol (such as MQTT-SN) can be made at or prior to deployment, based on the static conditions in which it will operate.

However, in the example of FIG. 1, sensor client 140*a* is mobile or is otherwise subject to variations in its ability to reliably transmit and receive using particular wireless communication networks. Specifically, in the example of FIG. 1, second communications network 114 and third communications network 116 provide connectivity within respective coverage areas 134, 136. As the sensor client 140*a* moves, as indicated by the motion arrow 180, its ability to use each of the second and third communications networks 114, 116 varies over time.

There is currently no solution for a sensor client, such as sensor client 140*a* of FIG. 1, which moves or otherwise operate in an environment which varies over time. There is, accordingly, a need to provide an improved messaging system.

In accordance with examples of the present disclosure, a client supports two or more messaging protocols, and performs a context assessment to decide which messaging protocol to use for publishing data towards the data broker and/or receiving data to which it is subscribed. The use of the multiple messaging protocols is managed at the client by a unified messaging session. The unified messaging session function may present a single interface to a data source or data sink at the client, so that the data source or data sink is unaware of (and may have no control of) the selected messaging protocol.

Where the client is a sensor client, data published by the client is subject to subscription processing at the data broker in a common manner, irrespective of the messaging protocol by which the data was published by the client.

Figure 2:
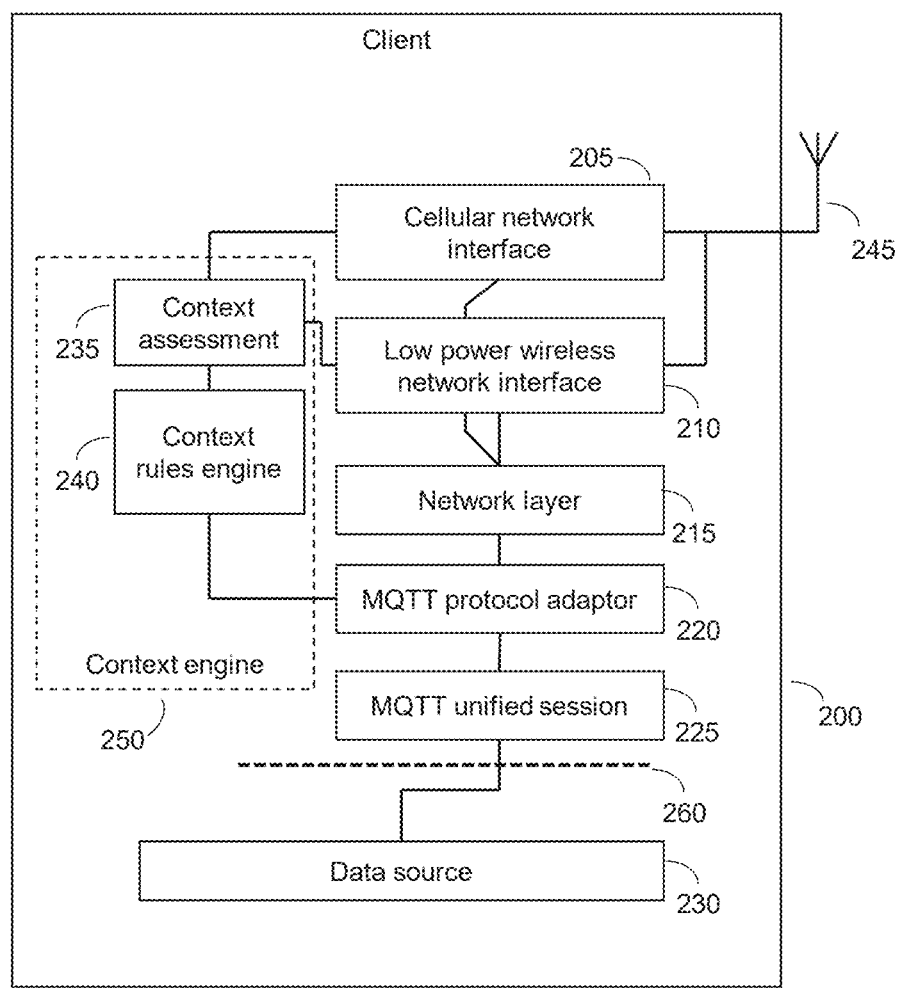
FIG. 2 is a block diagram of a client in accordance with examples.

FIG. 2 shows a block diagram of a client in accordance with examples. The client 200 may be the sensor client 140*a* of FIG. 1. The client 200 comprises a cellular network interface 205 and low power wireless network interface 210, each connected to an antenna 245. In some examples, each of the cellular network interface 205 and low power wireless network interface 210 may be coupled to different respective antennae. In an example, the cellular network interface 205 allows the client 200 to connect to the second communications network 114 of FIG. 1, and the low power wireless network interface 210 allows the client 200 to connect to the third communications network 116 of FIG. 1. In some examples, there may be only one network interface.

Network layer 215 is connected to each of the cellular network interface 205 and the low power wireless network interface 210. It processes control packets generated by MQTT protocol adaptor 220 for transmission via the network interfaces. Accordingly, when control packets generated by the MQTT protocol adaptor 220 are passed to the network layer 215, there may also be passed one or more of:
  an indication of which of the network interfaces is to be used for the transmission of the control packet, and
  an indication of how the control packet is to be transmitted (for example, whether it is to be transmitted using TCP/IP or UDP).

The network layer 215 may encapsulate the control packet in a suitable internet protocol (IP) packet, and further process the IP packet according to a transport layer protocol suitable for transmission via the indicated interface. MQTT protocol adaptor 220 implements two (or more) messaging protocols. A first messaging protocol may be MQTT, and a second messaging protocol may be MQTT-SN. Data received from MQTT unified session 225 is processed according to one of the messaging protocols, selected in accordance with output from a context rules engine 240.

MQTT unified session 225 presents a messaging interface 260 to a data source 230 for receiving data to be published to the data broker 120 of FIG. 1. The client 200 may determine a topic associated with the data. The topic may be indicated by the data source 230, via the messaging interface 260, to the MQTT unified session 225. Data is passed to the MQTT unified session 225 via the messaging interface 260 in a manner irrespective of the messaging protocol which will be used to publish the data. For example, where implemented in software, the MQTT unified session 225 may present, as the messaging interface 260, a single application programming interface (API) for receiving multiple instances of data from the data source 230, even though the instances of data may be published using different messaging protocols. In the example of FIG. 2, only one data source 230 is shown, but it will be appreciated that in some examples, the MQTT unified session 225 receives data from two or more data sources. In some examples, where the client 200 is a subscriber client and not a sensor client, there may be no data source, and messaging interface 260 may be used to notify a data sink of data published by the data broker 120 to the client 200 in accordance with a subscription of the client 200.

The messaging interface 260 may support requests and notifications which are commonly supported by both messaging protocols. For example, the messaging interface 260 may support the following requests from a data source or data sink: CONNECT, SUBSCRIBE, UNSUBSCRIBE, PUBLISH, DISCONNECT. The messaging interface 260 may support a data notification to a data sink. The messaging interface 260 may receive or indicate parameters associated with these requests. For example, a PUBLISH request may indicate the data to be published. A CONNECT request may indicate a 'will' message to be published on its behalf by the data broker 120 in certain specified circumstances, such as when a communication error is detected at the data broker 120.

In an example, the messaging interface 260 may comprise an API which is identical to an API provided in a client where only one of the messaging protocols is supported.

While there may exist, over time, two or more sessions using different messaging protocols with the data broker 120 (such as via the two different network interfaces 205, 210), the data source 230 may be aware of only a single (virtual) MQTT session, which will be described in further detail below.

Figure 3:
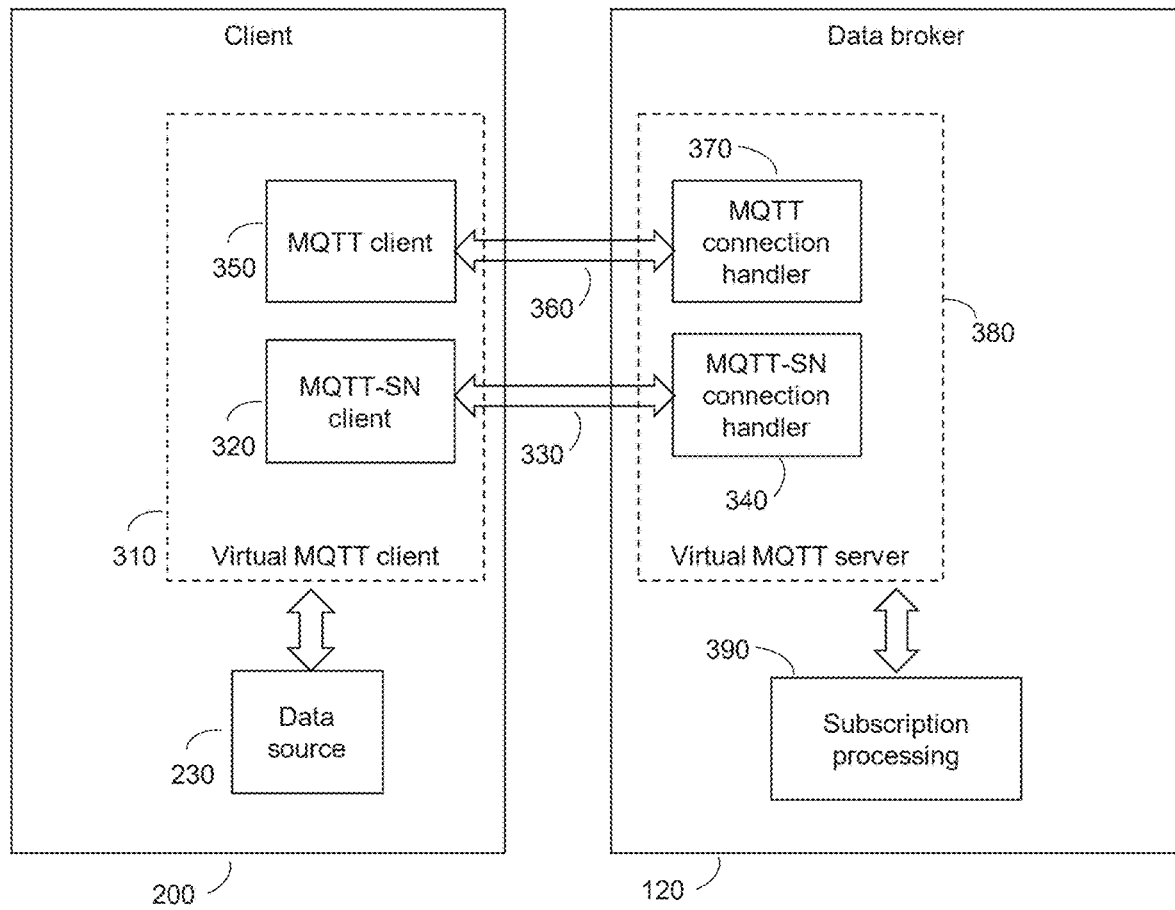
FIG. 3 is a block diagram showing the use of multiple messaging protocols and corresponding client-broker connections according to examples.

The use of multiple messaging protocols is illustrated in FIG. 3 which is described below.

Context engine 250 comprises a context assessment function 235 and context rules engine 240. Context engine 250 determines a network profile indicating one of the messaging protocols supported by the client 200. This determination may be in response to a trigger. Examples of the trigger are described further below. The determination is based on one or more parameters.

The context assessment function 235 evaluates one or more parameters which are provided to the context engine 250. In the example of FIG. 2, the context assessment function 235 receives information from the network interfaces 205, 210. In general, the context assessment function 235 determines and classifies the present conditions of the client 200. This determination and classification may occur asynchronously with respect to any MQTT session activity or data processing.

Parameters determined by the context assessment may include those in one or more of the following categories:

Network—examples of such parameters include signal strength and signal quality measurements, available network technologies (e.g. LTE, NB-IoT, NTN), a currently selected network technology, and network identifiers (e.g. public land mobile network, PLMN, identifiers or IEEE 802.11 service set identifier, SSID). The relevant network interface may provide a list of available networks, a registration status and access technology of a serving cell, a general packet radio service (GPRS) registration status and access technology of a serving cell, a registration status and access technology of a serving cell in a cell using long term evolution (LTE) or a newer cellular technology and/or a signal strength indicator. These may be obtained by querying the relevant network interface via a suitable Hayes AT command query.

External Sensor—these parameters may be derived from the operation of hardware and/or software residing on (or connected to) the client device itself, for example an accelerometer or location function (e.g. based on a satellite positioning system). These parameters may be obtained from sensors which also provide data for publication via the data source 230. In some examples, the context assessment function 235 may receive sensor data and/or its associated topic from one or more data sources 230.

Client device condition—these parameters reflect the current operating condition of the device, for example battery level. These may also reflect a configuration of the client device: for example, a client may be configured with one or more 'home' networks where the cost of data transmission may be lower than if the device is connected to a non-home network (e.g., is roaming).

Context rules engine 240 selects a network profile for the transmission of published data based on one or more parameters determined by the context assessment function 235. The network profile defines a messaging protocol selected from the messaging protocols supported by the client 200. The network profile may also define one or more of a network interface to be used, a transport protocol to be used, and a network operator.

The network profile may be selected from one or more predefined network profiles. Examples of predefined network profiles are shown below in Table 1:

TABLE 1

| Profile ID | Messaging protocol | Transport protocol | Wireless communications network type |
|---|---|---|---|
| 1 | MQTT version 5.0 | TCP/IP or TLS | LTE (Preferred operator) |
| 2 | MQTT version 5.0 | TCP/IP or TLS | LTE (other operator) |
| 3 | MQTT version 3.1.1 | TCP/IP or TLS | LTE |

TABLE 1-continued

| Profile ID | Messaging protocol | Transport protocol | Wireless communications network type |
|---|---|---|---|
| 4 | MQTT version 1.2 | UDP or DTLS | GSM/NB-IoT/LTE-M/NTN/BLE/ZigBee |
| 5 | MQTT version 2.0 | UDP or DTLS | GSM/NB-IoT/LTE-M/NTN/BLE/ZigBee |

A network profile may be associated with one or more criteria, whereby the profile can be selected only if the criteria are satisfied. The criteria may be based on parameters determined by the context assessment function 235.

For example, profiles 1 and 2 set out in Table 1 may be associated with a RSSI criteria: if the RSSI measure for an available LTE network is at or above a predetermined threshold, then that network profile may be a candidate for selection. Profile 1 may be associated with an additional criteria that a mobile network operator associated with an available network is equal to a 'home' operator configured for the client 200.

Other criteria may include that a country code (which may be derived from a network identifier, such as a PLMN ID, of a cellular network) matches a 'home' country code configured for the client 200.

Criteria may be specific to particular messaging operations. For example, specific criteria may apply to publishing data associated with a particular topic.

The predefined network profiles may be associated with a relative priority. The context rules engine 240 may select a predetermined network profile having the highest priority of those for which the corresponding criteria are satisfied. Referring to the example network profiles of Table 1, network profiles having a lower identity may have a corresponding higher priority. A network profile may be designated as a default profile, to be used when there is no other network profile whose respective criteria are satisfied.

A network profile with a higher priority may be associated with a lower cost per transmission than a network profile with a lower priority. Accordingly, where the cost of transmitting and receiving data in networks operated by different operators, or using different technologies is different, the selection of an appropriate network profile can reduce the operating cost of the client.

In some examples, there may be a single network interface for connecting to any network supporting one of a set of 3GPP network technologies. The predetermined network profiles may define, for each network technology, the messaging protocol and transport protocol to be used according to (at least) the technology (LTE, LTE-M, NB-IoT, 5G/NR, etc.) of a currently selected cellular network. The currently selected cellular network technology may be selected in accordance with specified behaviour defined by standards specifications, such as those defined by 3GPP and its partners.

FIG. 3 is a block diagram showing functions of a client 200 and data broker 120 and corresponding client-broker connections according to examples. At the client 200, client functionality is provided for at least two messaging protocols; in the example of FIG. 3, these are MQTT and MQTT-SN. Accordingly, at the client 200 there is provided an MQTT client 350 and an MQTT-SN client 320. These are operable to establish corresponding connections 360, 330, in accordance with their respective messaging protocols, with corresponding connection handler functionality 370, 340 at the broker 120. It will be appreciated that at any given time, there may be none, or only one of connections 360,330 established. The MQTT client 350 and MQTT-SN client 320 may be implemented at the MQTT protocol adaptor 220 of FIG. 2.

At the client 200, a Virtual MQTT client 310 functionality is also provided. This makes use of, selectively, the MQTT client 350 or MQTT-SN client 320 for publishing data towards the broker. It provides an API or other suitable interface to data source 230, and appears, to the data source 230 as a single client. The interface to the data source 230 may be the messaging interface 260 of FIG. 2 and the Virtual MQTT client 310 may perform the functions of the MQTT unified session 225 of FIG. 2.

At the data broker 120, MQTT connection 360 and MQTT-SN connection 330 are terminated at an MQTT connection handler 370 and an MQTT-SN connection handler 340, respectively. Where the data broker includes an embedded MQTT-SN gateway, MQTT-SN connection handler 340 may be within the MQTT-SN gateway (not shown). Each of the MQTT connection handler 370 and MQTT-SN connection handler 340 processes receive and process control packets in accordance with a subset of the appropriate protocol. For example, the MQTT connection handler 370 and MQTT-SN connection handler 340 may generate and transmit acknowledgement packets.

Data messages (i.e. messages within PUBLISH control packets) from the client 200 are received at either the MQTT connection handler 370 or the MQTT-SN connection handler 340, depending on the network profile in use at the client 200. As explained further below, when the client 200 establishes the MQTT connection 360 and MQTT-SN connection 330, a same client identifier is used in the connection requests. Thus, the data broker 120 is able to associate the MQTT connection handler 370 and MQTT-SN connection handler 340 within a single Virtual MQTT server 380. Messages received at the virtual MQTT server 380 are then passed to a subscription processing function 390, which determines which, if any subscriber clients are to receive the messages. The subscription processing function 390 and functions for subsequent processing of the published data (which are omitted for clarity from FIG. 3) may be in accordance with conventional publish/subscribe techniques and may be performed irrespective of the messaging protocol used by the client to publish the data.

Where the client 200 is a subscriber client, the subscription processing function 390 may determine that one or more data messages are within the scope of a subscription of the client 200. Accordingly, the messages are passed to the virtual MQTT server 380 and are transmitted to the client 200 via MQTT connection 360 or MQTT-SN connection 330, by the appropriate connection handler, depending on the network profile currently in use at the client 200.

Figure 4:
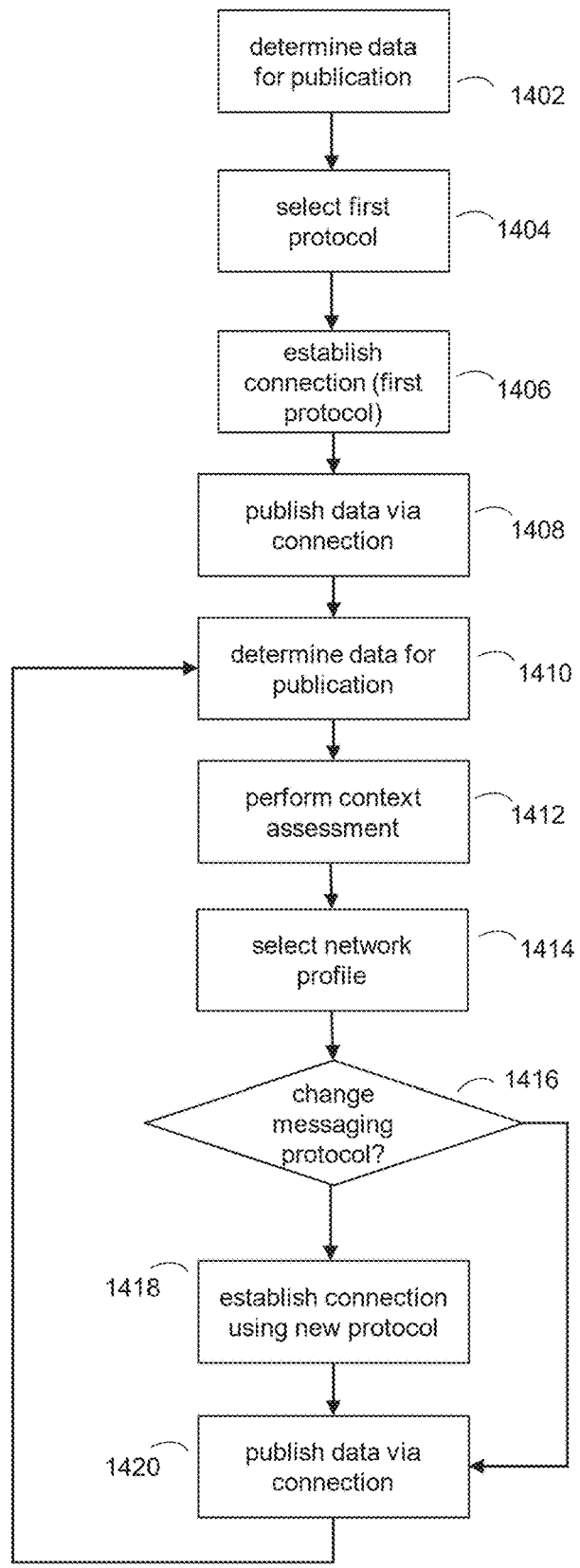
FIG. 4 is a flow chart of a process at a client in accordance with examples of the present technique.

FIG. 4 is a flow chart of a process at the client 200 in accordance with examples of the present technique.

At the start of the process, no MQTT connection or MQTT-SN connection is established. The process starts at step 1402, when the client 200 determines that data is to be transmitted (i.e., published) to the data broker 120. This may comprise the transmission of an indication from the data source 230 to the Virtual MQTT client 310. In the example of FIG. 4, the receipt of data at the Virtual MQTT client 310 triggers a context assessment and network profile selection, as described above. Based on the selected network profile. At step 1404 a first messaging protocol is selected. This may be based on the selected network profile as described above.

At step 1406, a connection to the broker 120 is established in accordance with the first messaging protocol. This may be, for example, MQTT connection 360 shown in FIG. 3. In establishing the connection, the client 200 includes a client identifier (ID) in the connection request. At step 1408, the data is transmitted to the data broker 120 using the established connection.

Subsequently, at step 1410, the client 200 determines that further data is to be published. This triggers a further context assessment at step 1412, and network profile selection at step 1414. As described above, in an example, the context assessment 1412 may determine a topic associated with the data identified at step 1410, and the network profile selection at step 1414 may determine a network profile based on the topic.

At step 1416, it is determined whether the messaging protocol associated with the network profile selected at step 1414 is the same as that which is currently active. If it is, then control passes to step 1420 and the data is published in accordance with that messaging protocol. If not, then control passes to step 1418 and a connection to the broker in accordance with the new messaging protocol is established. This new connection may be, for example, MQTT-SN connection 330 of FIG. 3. In establishing the new connection, the connection request sent in accordance with the new messaging protocol includes the same client ID as was sent at step 1406. Accordingly, the broker is able to associate the new connection with the connection established previously. The existing connection may be disconnected.

After step 1418, control passes to step 1420 and the data determined at step 1410 is published via the connection established at step 1418.

It will be appreciated that steps in this process may be changed. In some examples, additional steps may be present and, in some examples, one or more steps may be omitted, or performed in a different sequence from that shown in FIG. 4. For example, in some examples, steps 1412, 1414, 1416 and 1418 occur asynchronously with respect to steps 1410 and 1420, and/or are not performed in response to a determination of data to be transmitted. In other words, the context engine may perform a context assessment independently of any request from the data source 230. In some examples, context assessment occurs in accordance with a predetermined schedule.

In some examples, context assessment and network profile selection may be triggered in response to a change in a network situation (for example, a particular network or network technology becoming available or unavailable), a change in a reading of an external sensor, or a change in client device condition. For example, a context assessment and network profile selection may be carried out when a battery level of the client device drops below a predetermined threshold, when a client device becomes connected to an external power supply, or when a client device becomes disconnected from an external power supply.

In some examples, a context assessment and network profile selection may be based on data received from the data source 230; in such cases, the context engine may receive data (and/or its associated topic) from the MQTT unified session. The context engine may store this for use in a future context assessment or may trigger a context assessment in response to receiving this. In some examples, context assessment is carried out in response to receiving data for publication at the MQTT unified session, where no previous context assessment had been carried out.

Network profile switch criteria may be satisfied when, as a result of a context assessment, a network profile different from that currently in use is to be used for future control packet transmission.

Figure 5:
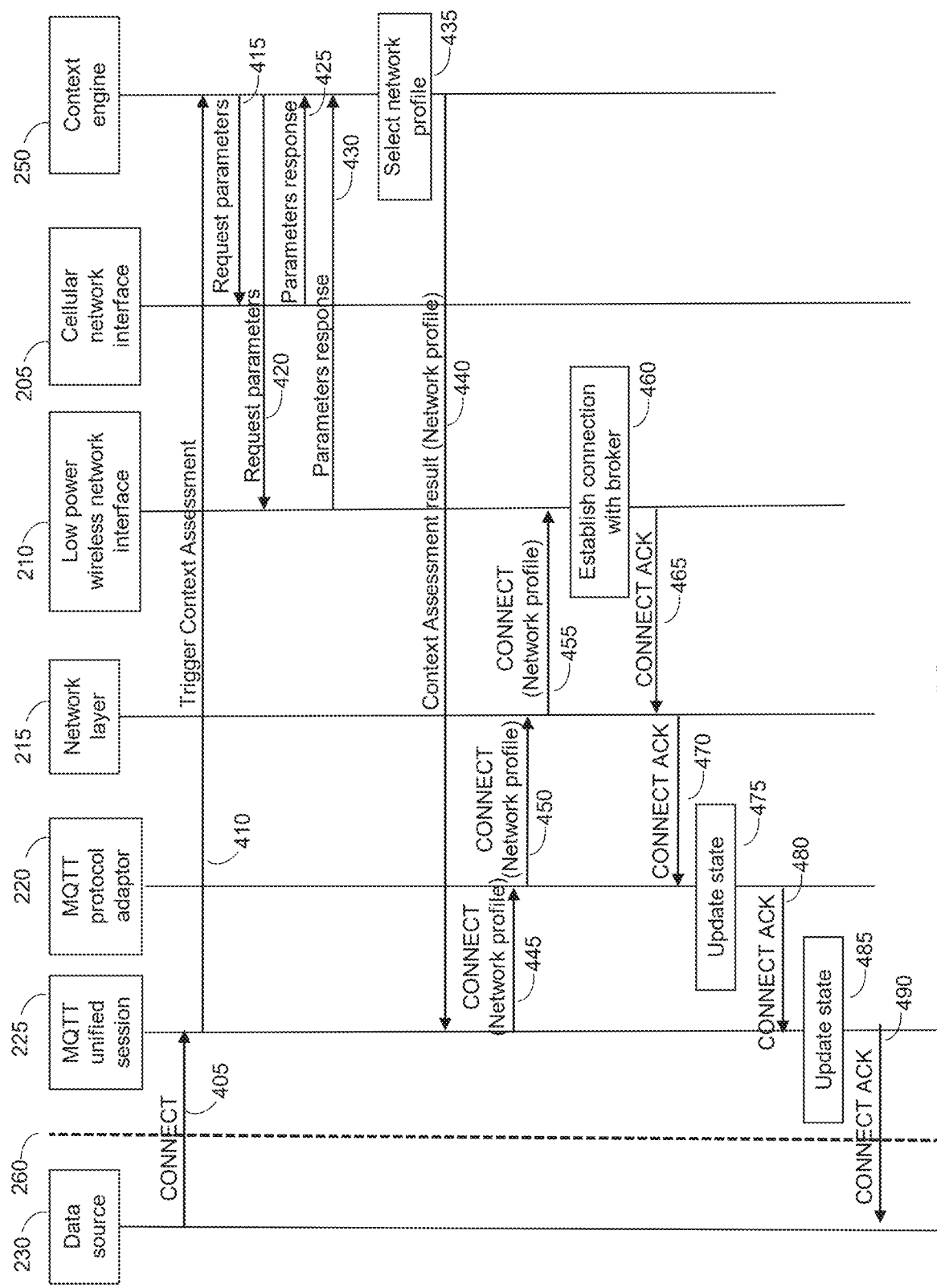
FIG. 5 is a message sequence chart which shows signalling in accordance with examples of the present disclosure.

FIG. 5 is a message sequence chart which shows signalling between the various functions illustrated in FIG. 2, in accordance with examples of the present disclosure. In the example of FIG. 5, the messaging interface 260 supports requests which correspond broadly to control packets generated in accordance with the MQTT protocol.

When the process of FIG. 5 starts, no MQTT or MQTT-SN connection has been established with the data broker 120. The process of FIG. 5 starts when data source 230 sends, via the messaging interface 260 to the MQTT unified session 225, a CONNECT request 405 to request the establishment of a connection with the data broker 120. The CONNECT request 405 may be in accordance with a conventional API request to establish an MQTT connection with the broker. In some examples, the CONNECT request 405 does not indicate which of the messaging protocols supported by the client 200 is to be used. In some examples, the CONNECT request 405 may implicitly or explicitly indicate a messaging protocol, but this is ignored by the MQTT unified session 225.

In response to receiving the CONNECT request 405, and based on the absence of any existing connection, the MQTT unified session 225 sends a notification 410 to the context engine 250 to trigger a context assessment.

In the example of FIG. 5, the context assessment is based on parameters associated with accessible wireless networks which can be reached using the low power wireless network interface 210 and the cellular network interface 205. Accordingly, the context engine 250 sends parameter requests 415, 420 to the cellular network interface 205 and to the low power wireless network interface 210, respectively. As described above, these may be in the form of one or more AT commands. The cellular network interface 205 and the low power wireless network interface 210 respond with respective parameter response indications 425, 430.

Based on the parameter response indications 425, 430, then at step 435, the context engine 250 assesses a plurality of network profiles against corresponding predetermined criteria and selects a network profile. Of those that satisfy the criteria, the one with the highest associated priority is selected; if none of the network profiles satisfy their respective criteria, a default network profile is selected. As discussed above, the network profile indicates a particular messaging protocol (e.g. MQTT or MQTT-SN) and may additionally indicate one or more of a particular network technology, operator, network identity, and transport protocol.

A Context assessment result 440, indicating the selected network profile, is sent to the MQTT unified session 225. The MQTT unified session 225 then sends a CONNECT indication 445, indicating the selected network profile, to the MQTT protocol adaptor 220. The MQTT protocol adaptor identifies the indicated messaging profile and generates a CONNECT packet 450 to be sent via the network layer 215 and appropriate network interface. In the example of FIG. 5, the selected network profile indicates that the messaging protocol to be used is MQTT-SN. Accordingly, the CONNECT packet 450 is formed in accordance with the MQTT-SN protocol. The CONNECT packet 450 is sent to the network layer 215 with an indication of the selected network profile. The MQTT protocol adaptor may also initialise the state associated with the MQTT-SN connection to indicate that a CONNECT packet has been submitted for transmission.

The network layer 215 generates a packet 455 comprising the CONNECT packet and sends this to the relevant network interface, together with an indication of relevant portions of the selected network profile. For example, the relevant portions may include a network identifier and network technology (e.g., IEEE 802.11n). In the example of FIG. 5, the selected network profile indicates that a low power wireless network which is accessible via the low power wireless network interface 210 is to be used. Accordingly, the packet 455 and network details are sent to the low power wireless network interface 210.

At step 460, the low power wireless network interface 210 connects to the identified network (if it is not already connected) and transmits the CONNECT packet to the data broker 120. This may be via the data aggregator 160 if the client 200 communicates using the third communications network 118 of FIG. 1. The CONNECT packet sent to the data broker 120 includes a client identifier which is used for both messaging protocols and allows the data broker 120 to determine that, where two connections using different messaging protocols are established, these are from the same client 200.

The low power wireless network interface 210 receives a corresponding connection acknowledgement ('CON-NACK') packet from the data broker 120 or data aggregator 160.

The CONNACK packet is sent 465 to the network layer 415, and thence to the MQTT protocol adaptor 220 (in indication 470) and to the MQTT unified session 225 (in indication 475). These indications 465, 470, 475 may include parameters such as an indication of the network interface at which the CONNACK packet was received.

In response to receiving the CONNACK packet 470, the MQTT protocol adaptor updates the state of the MQTT-SN connection at step 475 to reflect the receipt of the CON-NACK packet and, at step 480, forwards the CONNACK packet to the MQTT unified session 225, which accordingly updates the state of the 'virtual' MQTT connection. Further details of the session state maintained at the MQTT unified session 225 is provided below.

The MQTT unified session 225 then sends, via the messaging interface 260, a CONNACK indication 490 to the data source 230. This may indicate that a connection with the data broker has been established in accordance with at least one of the messaging protocols. In some examples, the indication 490 does not identify the messaging protocol or any other details of the network connection used to establish the connection.

The MQTT protocol adaptor 220 maintains the actual state of the MQTT-SN and/or MQTT connections which are established with the data broker 120. The MQTT unified session 225 maintains (or otherwise determines) a 'virtual connection' state; this state may be exposed to the data source or other function via an API such as messaging interface 260, but may do so in a manner that conceals the underlying state of the MQTT and/or MQTT-SN connections. The virtual connection state may be a superset of a connection state associated with a messaging protocol, so that the messaging interface 260 may appear to be an interface which is also suitable for a connection using that messaging protocol. Accordingly, after the CONNECT indication 445 is sent from the MQTT unified session 225 to the MQTT protocol adaptor 220, the virtual connection state may be updated to reflect that the CONNECT packet has been generated for transmission (even though at this stage, the actual CONNECT packet may not yet have been generated at the MQTT protocol adaptor 220).

It will be appreciated that the sequence of steps may be carried out in a different order, one or more steps may be omitted, and one or more additional steps may be included. For example, where the selected messaging protocol is MQTT, the network layer 215 may generate packets for establishing and maintaining a TCP/IP connection, if the selected messaging protocol in MQTT, and a TCP/IP connection is not already established.

In an example, the network profile identifies only the messaging protocol, and the network layer and network interface(s) operate independently of the outcome of the context assessment (other than to the extent that the messaging protocol defines or constrains operations at those layers). Accordingly, in an example, indications 450, 455 from the MQTT protocol adaptor 220 and network layer 215 indicate the messaging protocol associated with the selected network profile.

In some other examples, the network profile specifies certain aspects of the manner in which the data is to be transmitted. Accordingly, indications 450, 455 from the MQTT protocol adaptor 220 and network layer 215 may include aspects of the network operation specified by the selected network profile which are relevant to the receiving function. For example, the network layer may require information regarding the transport protocol, IP interface and (for onward transmission to the network interface) parameters associated with the wireless network; accordingly, the MQTT protocol adaptor may discard the messaging profile information from the network profile before sending the CONNECT packet 450 to the network layer. Similarly, the network layer 450 may discard portions of the network profile information which are not relevant to the operation of the network interface.

The virtual session state at the MQTT unified session 225 comprises state associated with both messaging protocols. For example, the virtual session state may comprise the following state which is derived from the state of an ongoing (or previous) MQTT connection:

QoS 1 and QoS 2 messages which have been sent to the data broker 120, but have not been completely acknowledged.

QoS 2 messages which have been received from the data broker 120, but have not been completely acknowledged.

The virtual session state may also comprise the following derived from an ongoing or previous MQTT-SN connection:

Registered Topic Aliases
Preconfigured Topic Aliases
Gateway Addresses

As described further below, when the active messaging protocol is changed as the result of a context assessment, the operation continues based on the state associated with the previous messaging protocol. Accordingly, for example, messages which were initially sent in accordance with one messaging protocol (either by the client or the broker) may be retransmitted in accordance with the new messaging protocol. In some examples this is effected by updating the state of both protocols as transmissions occur. In some examples, the state of the newly selected protocol is populated, based on the state associated with the previous messaging protocol, in response to a determination that the messaging protocol is to be changed.

Corresponding to the virtual session state maintained at the client, the data broker 120 also maintains a virtual session state which reflects both MQTT and MQTT-SN transmissions between the client and data broker. Specifically, this data broker virtual session state may reflect the following state which is derived from an ongoing (or previous) MQTT connection:
  The existence of an MQTT session (even if the rest of the session state is empty).
  The client's subscriptions, including any Subscription Identifiers.
  QoS 1 and QoS 2 messages which have been sent to the client, but have not been completely acknowledged.
  QoS 1 and QoS 2 messages pending transmission to the client and, in some examples, QoS 0 messages pending transmission to the client.
  QoS 2 messages which have been received from the client, but have not been completely acknowledged.
  The Will Message and the Will Delay Interval
  If the session is currently not connected, the time at which the MQTT session will end and MQTT session state will be discarded.
The data broker virtual session state may also comprise the following derived from an ongoing MQTT-SN connection:
  Registered Topic Aliases
  Preconfigured Topic Aliases
  Network Addresses
Both the client device and data broker populate their respective virtual session states according to the connection profile being used. For example, when the MQTT-SN connection is active, the virtual session states are populated with items when handling delivery and receipt of acknowledged packet types (QoS 1 & 2).

The virtual session state is maintained when a unified session transitions between messaging protocols, and the newly-used connection operates in accordance with the relevant portions of the virtual session state. Accordingly, for example, where a subscription was established using one connection, but a different connection is now selected according to the most recent context assessment, the new connection operates as though that subscription was established using the new connection.

Figure 6:
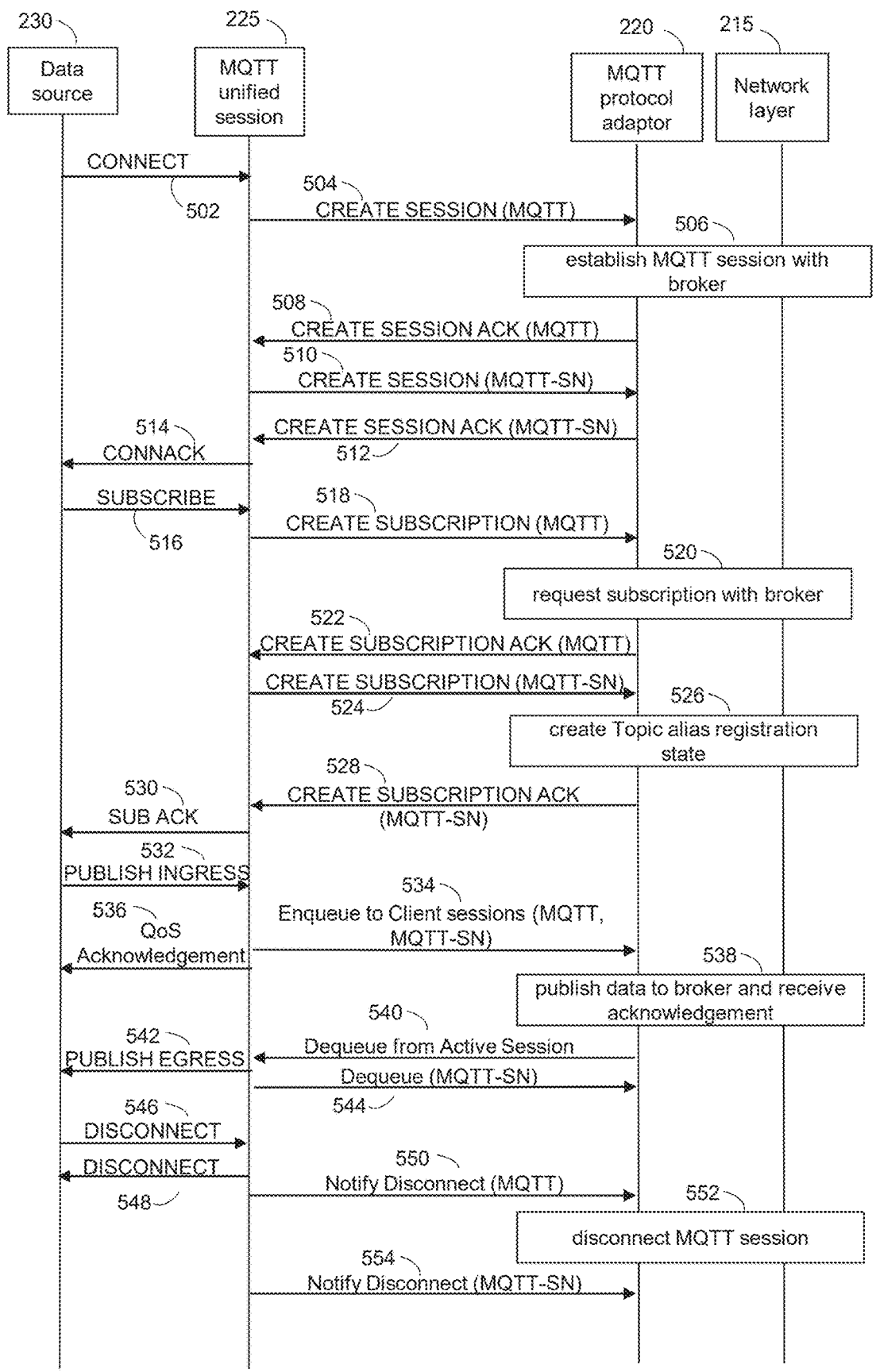
FIG. 6 is a message sequence chart which shows signalling in accordance with examples of the present disclosure.

FIG. 6 is a message sequence chart showing an operation of the messaging interface 260 between the data source 230 (which in this example is also a data sink) and the MQTT unified session 225, and corresponding behaviour of the MQTT protocol adaptor 220 in accordance with examples of the present disclosure. For conciseness and clarity, the detailed operation of the network layer 215, context engine 250, and network interface(s) 205, 210 is not shown.

The messaging interface 260 in this example provides an API allowing requests and indications related to the establishment and termination of sessions, publication of data, and subscriptions.

The message sequence in FIG. 6 begins with a CONNECT request 502 from the data source 230 to the MQTT unified session 225. In response, the MQTT unified session 225 issues CREATE SESSION indications 504, 510 in respect of MQTT and MQTT-SN to the MQTT protocol adaptor 220 which, respectively, request the establishment of an MQTT session and an MQTT-SN session.

A context assessment by the context engine 250 (not shown) prior to the issuance of indication 504 selects the MQTT protocol in preference to the MQTT-SN protocol. In the example of FIG. 6, the outcome of this assessment is communicated at least to the MQTT protocol adaptor 220. Accordingly, in response to the indications 504, 510, at step 506 the MQTT protocol adaptor 220 establishes, by generating the appropriate control packets and passing these to the appropriate network interface, an MQTT connection with the data broker 120.

In response to the CREATE SESSION (MQTT) indication 504 and following the successful establishment of the MQTT connection with the data broker 120, the MQTT protocol adaptor 220 sends a CREATE SESSION ACK (MQTT) indication 508 to the MQTT unified session 225.

In response to the CREATE SESSION (MQTT-SN) indication 510, based on the selection of the MQTT protocol as preferred, the MQTT protocol adaptor 220 does not attempt to establish an MQTT-SN connection, but sends a CREATE SESSION ACK (MQTT-SN) indication 512 to the MQTT unified session 225. The MQTT protocol adaptor 220 may initialise state corresponding to an MQTT-SN session, to be maintained in parallel with, and based on, the state of the MQTT connection.

In response to receiving the CREATE SESSION ACK (MQTT) indication 508 and CREATE SESSION ACK (MQTT-SN) indication 512, the MQTT unified session 225 acknowledges the CONNECT Request 502 by sending a CONNACK indication 514 to the data source 230.

Accordingly, in response to the CONNECT request 502 from the data source 230, a single connection to the data broker 120 is established, using a preferred protocol which is selected from different publish/subscribe protocols in accordance with a context assessment.

In the example of FIG. 6, the data source 230 also functions as a data sink and indicates that it wishes to subscribe to certain published data by sending a SUBSCRIBE request 516 to the MQTT unified session 225. In response, the MQTT unified session 225 sends CREATE SUBSCRIPTION (MQTT) indication 518 and CREATE SUBSCRIPTION (MQTT-SN) indication 524 to the MQTT protocol adaptor 220. At this stage, either no further context assessment has been carried out or a context assessment has been carried out in which MQTT was selected as the preferred protocol. Accordingly, the MQTT protocol adaptor 220 transmits at step 520, using the established MQTT connection with the broker 120, a corresponding subscription request to the data broker 120 and receives a corresponding acknowledgement.

Even when a connection in accordance with a particular protocol is not currently established with the data broker 120, the MQTT protocol adaptor 220 may maintain state in accordance with that protocol. This may be updated based on transmitted or received messages and indications or state changes associated with another protocol. Similarly, the broker 120 may maintain state associated with a client and protocol even though no connection using that protocol with that client is active, which is updated based on corresponding signalling, indications or state changes associated with the same client and a different protocol. Accordingly, if a context assessment results in a switch of preferred protocol, the state used for the newly-preferred protocol is one which takes into account activity associated with the previously-preferred protocol.

In the example of FIG. 6, in response to the CREATE SUBSCRIPTION (MQTT-SN) indication 524, at step 526, the MQTT protocol adaptor 220 initialises a topic alias registration state in the context of MQTT-SN, even though no active MQTT-SN connection has been established.

Having updated the respective state for both protocols and having received an acknowledgement from the broker 120 of the subscription request, the MQTT protocol adaptor 220 sends CREATE SUBSCRIPTION ACK acknowledgement indications 522 and 528 to the MQTT unified session 225, and the MQTT unified session 225, in response, acknowledges the SUBSCRIBE request 516 by means of a SUB ACK indication 530.

At the broker, as described above, a unified state is maintained which is common to an MQTT connection and an MQTT-SN connection. Accordingly, subscription processing, at the data broker 120, of published data which is the subject of a subscription by the client 200 on behalf of the data source 230 is carried out irrespective of the connection used to request the subscription, and irrespective of whichever of the MQTT and MQTT-SN connections is currently established. If, according to the subscription, the client 200 is subscribed to published data, then the data broker 120 publishes the data via whichever of the MQTT and MQTT-SN connections is currently preferred in accordance with the current network profile of the client.

A further example of state that is maintained for both MQTT and MQTT-SN is state associated with published (or to be published) data. Specifically, state is maintained such that any QoS requirement associated with the data can be satisfied if there is a context assessment resulting in a switch from one protocol to another (and thus from one connection to another) which occurs before it can be assured that the data has been published in accordance with that QoS requirement.

FIG. 6 shows an example of a publishing process. The data source 230 sends a PUBLISH INGRES request 532 to the MQTT unified session 225, indicating data and associated QoS requirements. The MQTT unified session 225 indicates by indication 534 to the MQTT protocol adaptor 220 that the data should be enqueued for both MQTT and MQTT-SN transmission. Because MQTT is still the preferred connection, then at step 538, the MQTT protocol adaptor 220 generates an MQTT packet containing the data, transmits this to the broker 120, and receives an acknowledgement of receipt. In response to receiving the acknowledgement, the MQTT protocol adaptor 220 sends an indication 540 to indicate that the data has been removed from the queue of the active session (i.e. the MQTT session). In response to the indication 540, the MQTT unified session 225 sends an indication 544 to request the MQTT protocol adaptor 220 to dequeue the data from the MQTT-SN session, and indicates to the data source 230 a PUBLISH EGRESS indication 542.

If instead, at step 538, no acknowledgement is received, and the preferred protocol is changed to MQTT-SN, then, depending on the QoS requirements associated with the message, the MQTT protocol adaptor 220 may establish an MQTT-SN connection with the data broker 120 and perform any needed retransmission(s) of the data from the MQTT-SN queue, via the MQTT-SN connection.

The process in FIG. 6 continues with the data source 230 sending a DISCONNECT request 546 to the MQTT unified session 225. This is immediately acknowledged by the MQTT unified session 225 with a DISCONNECT notification 548, and the MQTT unified session 225 transmits Notify Disconnect indications 550, 554 in respect of MQTT and MQTT-SN to the MQTT protocol adaptor 220. Because only the MQTT connection is active, at step 552 the MQTT protocol adaptor 220 performs an MQTT disconnect procedure with the data broker 120. State associated with both the MQTT and MQTT-SN protocols may be terminated or deleted.

Where a context assessment at the client 200 indicates that the messaging protocol is to be changed from that currently in use (and for which a connection is established and ongoing), the MQTT unified session 225 may coordinate suitable steps to be carried out by the MQTT protocol adaptor 220, in advance of transmitting further data or control messages via the newly-selected messaging protocol. These steps may include one or more of i) establishing a messaging protocol connection using the new protocol, and ii) disconnecting the established connection.

As described above, when a new connection is established, the same client identifier is used as was used to establish previous connection using the different messaging protocol. Accordingly, the data broker 120 is able to determine that the new connection and the previous connection are parts of a single virtual connection, and to process published data and any existing subscriptions accordingly. The CONNECT packets sent to establish the connections may indicate 'clean=false'. That is, the MQTT CleanSession flag indicates that the session is a persistent session and that the broker is to store all subscriptions for the client and all missed messages for the client that subscribed with a Quality of Service (QoS) level 1 or 2.

The existing established connection may be disconnected by issuing a DISCONNECT packet on the established connection.

The switching of the connections from MQTT to MQTT-SN or vice versa is handled transparently to the data source 230 or any data sink at the client 200. In particular, provided that at least one connection is established using either MQTT or MQTT-SN, the virtual session state indicates that a connection is in place. Because the virtual session state persists across connections, any outstanding QoS requirement associated with data transmitted using one connection is satisfied via the new connection.

As described above, in some examples, the data source 230 issues requests which correspond to control packets defined by one of the messaging protocols.

In some examples, a request corresponds to functionality which is not supported by the currently selected protocol. Where a request is made which is incompatible with the currently selected protocol, this request may be ignored by the MQTT unified session 225. For example, MQTT-SN provides particular features related to a sleep state, which are not possible using MQTT. If the data source 230 issues a request to the MQTT unified session 225 to perform a function related to a sleep state, which is not supported by the MQTT unified session 225, the MQTT unified session 225 may ignore the request. Alternatively, the MQTT unified session 225 may issue a request to the MQTT protocol adaptor 220 to request that state associated with the protocol(s) which support the request (e.g., the MQTT-SN protocol) is updated such that should the preferred protocol be changed, then the appropriate control packet transmissions, in accordance with the new preferred protocol, is transmitted.

In some examples, the data source 230 may receive a notification indicating which protocol is currently selected and may adapt its operation to make use of functions or procedures which are supported by that protocol. For example, if the MQTT-SN protocol is currently preferred, the data source 230 may issue a request which is compatible with that protocol. The MQTT unified session 225 may indicate to the data source 230 which protocol is currently selected, for example in the CONNACK indication 514, SUB ACK indication 530, QoS Acknowledgment 536, PUBLISH EGRESS indication 542 or DISCONNECT indication 548.

In some examples, a context switch occurs in response to a request from the data source. In particular, the context switch may occur in response to a request for the transmission of a control packet. In a particular example, the context switch occurs in response to a request to transmit a PINGREQ ('ping request') packet comprising the client ID. A conventional effect of such a packet may be to indicate to the data broker 120 that the client 200 has temporarily exited a sleep state and is in an 'awake' state. The data broker may respond with a PINGRESP ('ping response') packet to indicate that it has no data to transmit to the client 200.

Figure 7:
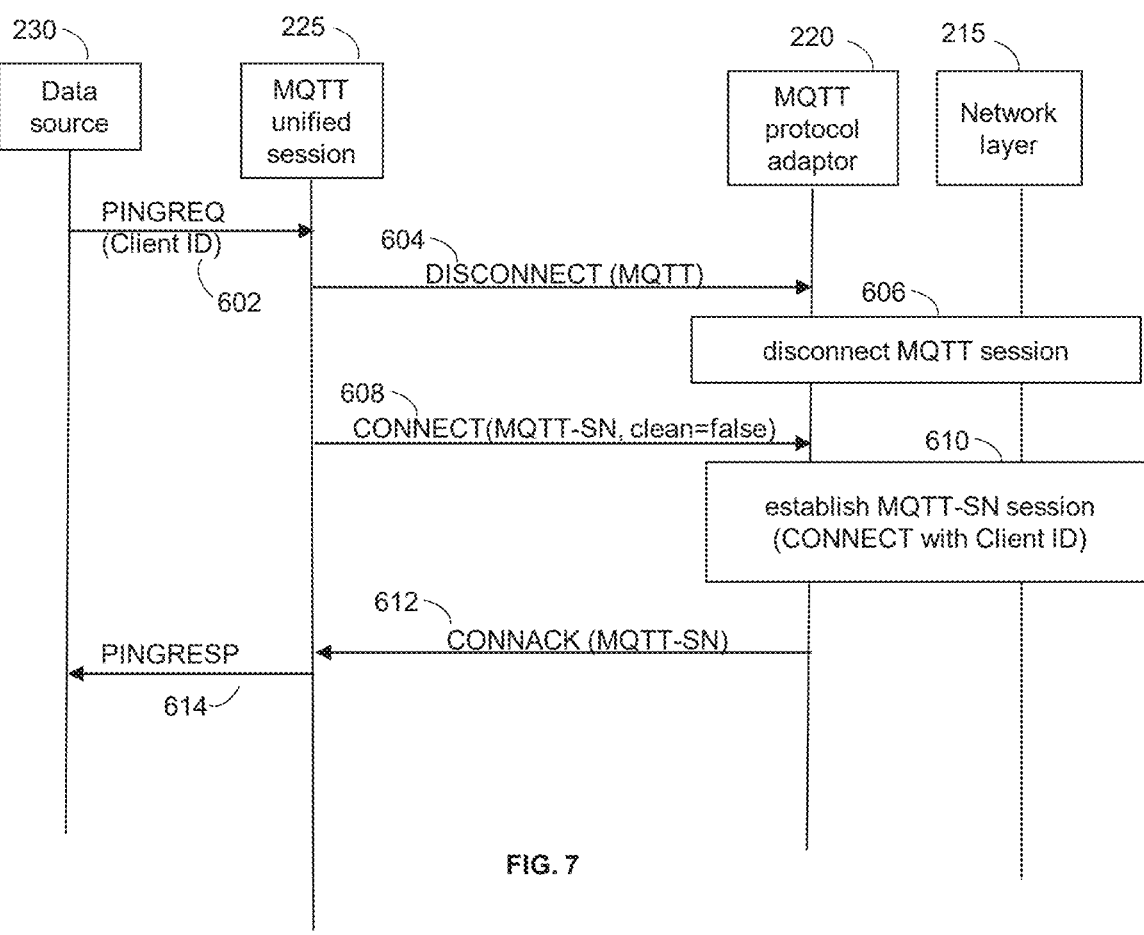
FIG. 7 is a message sequence diagram which illustrates a context switch in accordance with examples of the present disclosure.

FIG. 7 is a message sequence diagram which illustrates a context switch in accordance with examples of the present disclosure, in which in response to a request to transmit a PINGREQ control packet comprising a client identifier, the client 200 performs a context switch and does not send the PINGREQ packet. As in FIG. 5, details of the operation of the network layer 215 and network interfaces 205, 210 are omitted for clarity.

At the start of the process, the selected messaging protocol is MQTT. The process starts with a request 602 from the data source 230 to transmit a PINGREQ message comprising the client ID. In response to a context assessment and profile selection and the request 602, the client 200 initiates a disconnection of the MQTT connection and an establishment of an MQTT-SN connection. The context assessment and profile selection may have been triggered by the request 602 or may have occurred independently of the request 602 but not yet effected.

Specifically, as shown in the example sequence of FIG. 6, the MQTT unified session 225 sends a DISCONNECT (MQTT) indication 604 to the MQTT protocol adaptor 220. The MQTT protocol adaptor 220 and the network layer 215 cause at step 606 the transmission of a DISCONNECT packet using the established MQTT connection.

The MQTT unified session 225 also sends a CONNECT (MQTT-SN) indication 608 to the MQTT protocol adaptor 220. The MQTT protocol adaptor 220 and the network layer 215 cause the transmission at step 610 of a CONNECT packet to establish a new MQTT-SN connection. The CONNECT packet includes the Client ID and indicates clean=false, i.e. the broker is to maintain state associated with the connection, even if it is disconnected.

In response to the successful establishment of the MQTT-SN connection at step 610, then the MQTT protocol adaptor 220 sends a CONNACK indication 612 to the MQTT unified session 225.

In response to the CONNACK indication 612, the MQTT unified session 225 sends a PINGRESP indication 614 to the data source 230. The PINGRESP indication 614 would conventionally indicate that a PINGRESP packet had been received from the data broker 120. In this example, a PINGRESP packet was not received from the data broker, because instead of the PINGREQ packet (requested to be sent by the data source 230 by the request 602), a context switch was carried out.

Examples above have been presented in the context of a sensor client which generates data for publication to the data broker 120. However, it will be appreciated that the same techniques can be applied to a subscriber client, where the selected network profile is used to determine a messaging protocol and, optionally, network configuration for receiving data published by the data broker, or to a client which is both a sensor client and a subscriber client.

It will also be appreciated that the selected network profile may be used to determine the messaging protocol and/or network configuration for the transmission and reception of control packets in response to control requests (e.g. subscribe, connect, disconnect) received from a data source or data sink.

The components of the client 200 may be implemented in hardware, or by means of a combination of hardware and software running on one or more suitable processors, for example a central processing unit (CPU), or other specialist processor, or a combination therefore, either within a single device or as part of a distributed computing system. Individual components may be implemented using a combination of hardware and software. For example, the cellular network interface 205 may comprise a radio frequency transceiver, one or more application specific integrated circuits together with a processor on which software is run.

The data source 230 may similarly comprise a hardware sensor (such as a temperature or pressure sensor) operating together with software running on a processor for processing the sensor data and providing the processed data to the MQTT unified session 225.

At least some aspects of the examples described herein comprise computer processes or methods performed in one or more processing systems and/or processors. However, in some examples, the disclosure also extends to computer programs, particularly computer programs on or in an apparatus, adapted for putting the disclosure into practice. The program may be in the form of non-transitory source code, object code, a code intermediate source and object code such as in partially compiled form, or in any other non-transitory form suitable for use in the implementation of processes according to the disclosure. The apparatus may be any entity or device capable of carrying the program. For example, the apparatus may comprise a storage medium, such as a solid-state drive (SSD) or other semiconductor-based RAM; a ROM, for example, a CD ROM or a semiconductor ROM; a magnetic recording medium, for example, a floppy disk or hard disk; optical memory devices in general, etc.

Figure 8:
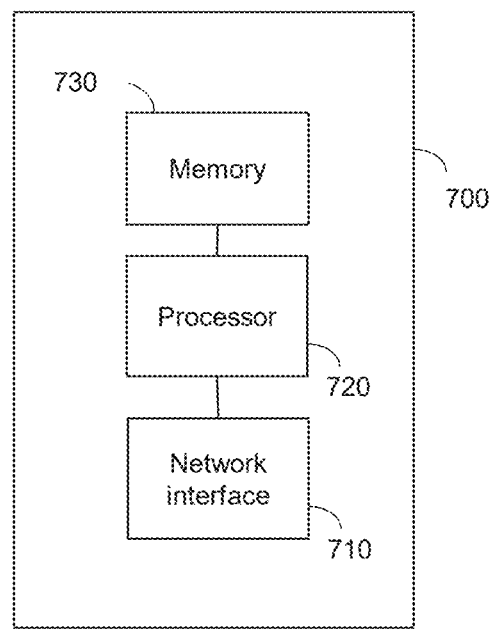
FIG. 8 is a simplified block diagram of a device in accordance with examples.

FIG. 8 is a simplified block diagram of a device 700 in accordance with examples. The device 700 may be provided to implement the data broker 120 as shown in FIG. 1 or the client 200 shown in FIG. 2. As shown, the device 700 includes processor 720, memory 730 and network interface 710, the memory 730 and network interface 710 coupled to the processor 720. The network interface 710 is for bidirectional communication and may include at least one antenna (such as the antenna 245 of client 200, shown in FIG. 2). The memory 730 may comprise a storage medium on which is stored a computer program in accordance with examples described herein.

The processor 710 may be of any type suitable and may include general purpose computers, application-specific integrated circuits, as non-limiting examples. In some examples, the device 700 may have multiple processors.

In some examples, the data broker 120 may be implemented using a plurality of devices 700 in a distributed architecture, in which the plurality of devices 700 cooperate. The MQTT connection handler 370 and MQTT-SN connection handler 340 of FIG. 3 may be implemented by the network interface 710 in conjunction with the processor 720 in accordance with program code stored on the memory 730. The Virtual MQTT server 380 and subscription processing function 390 may be implemented by the processor 720 in accordance with program code stored on the memory 730.

In some examples, the client 200 may be implemented using a device 700 comprising two or more network interfaces 710. The data source 230, context engine 250, MQTT unified session 225, MQTT protocol adaptor 220 and network layer 215 may be implemented by the processor 720 in accordance with program code stored on the memory 730.

The above embodiments are to be understood as illustrative examples. Further embodiments are envisaged. For example, systems as discussed herein may be deployed in other configurations and scenarios in which it is appropriate for a single client to use different messaging protocols from time to time.

The above embodiments are to be understood as illustrative examples. Further embodiments are envisaged. For example, systems as discussed herein may be deployed in other configurations and scenarios in which generated messages may be received in a manner which is unexpected or undesirable.

The above examples refer to sensor clients and sensor data. In other examples other types of data may be published by sensor clients or other types of clients.

In some examples described above, data source 230 provides data to the MQTT unified session 225; in some examples, this may be replaced by a function which acts as both a data source and a data sink or may be replaced by a function which acts only as a data sink. There may be two or more such functions (data source, data sink or both) in operation at the client 200.

It will be appreciated that the description in the above examples of indications and notifications between functions within the client 200 is illustrative and that in other examples, these may not be present or different indications and notifications may be used instead.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the disclosure, which is defined in the accompanying claims.

The following numbered paragraphs provide further example aspects and features of the present technique.

Paragraph 1. A method performed at a publish/subscribe messaging client, the method comprising:
receiving, via a messaging interface, first sensor data for publication,
establishing a first connection with the data broker in accordance with a first publish/subscribe messaging protocol, wherein the establishing comprises transmitting a connection request packet comprising an identifier of the sensor client via a first wireless communications network,
publishing first sensor data to the data broker in accordance with the first publish/subscribe messaging protocol using the first connection via the first wireless communications network using a connection-oriented transport protocol,
receiving, via the messaging interface, second sensor data for publication,
determining that criteria for using a second publish/subscribe messaging protocol in preference to the first publish/subscribe messaging protocol are satisfied,
establishing a second connection with the data broker in accordance with the second publish/subscribe messaging protocol, wherein the establishing comprises transmitting a second connection request packet comprising the identifier of the sensor client, and
publishing the second sensor data to the data broker in accordance with the second publish/subscribe messaging protocol using the second connection via a second wireless communications network using a connectionless transport protocol.

Paragraph 2. A method performed at a client in a publish/subscribe messaging system, the method comprising:
establishing with a message broker a first connection for the transmission of published data in accordance with a first publish/subscribe messaging protocol, wherein the establishing comprises transmitting a connection request packet comprising an identifier of the client via a first communications network,
using the first connection for the transmission of first published data in accordance with the first publish/subscribe messaging protocol,
determining that one or more network profile switch criteria for using the second publish/subscribe messaging protocol in preference to the first publish/subscribe messaging protocol are satisfied,
establishing with the message broker a second connection for the transmission of published data in accordance with a second publish/subscribe messaging protocol different from the first publish/subscribe messaging protocol, and
after the determining, using the second connection for the transmission of second published data in accordance with the second publish/subscribe messaging protocol.

Paragraph 3. A method according to paragraph 2, the method further comprising:
transmitting, according to one of the first and second messaging protocols, a subscription request, wherein the first published data and the second published data are within the scope of the subscription request.

Paragraph 4. A method according to paragraph 2, wherein the first published data is first data received at a messaging interface and the second published data is second data received at the messaging interface.

Paragraph 5. A method according to any of paragraphs 2 to 4, wherein the determining that one or more context switch criteria are satisfied is by selecting a network profile from a plurality of predetermined network profiles, and
according to the selected network profile, the second publish/subscribe messaging protocol is to be used.

Paragraph 6. A method according to any of paragraphs 2 to 5, wherein the selected network profile defines one or more of:
one or more cellular network operators;
one or more communication network technologies;
one or more transport layer protocols; and
one or more transport layer security protocols.

Paragraph 7. A method according to paragraph 5 or paragraph 6 wherein the second connection is established in accordance with the selected network profile.

Paragraph 8. A method according to any of paragraphs 2 to 7, wherein the determining comprises performing a context assessment in response to a determination that sensor data is to be transmitted or in response to one or more trigger criteria being satisfied, the trigger criteria being based on one or more of:
a pre-determined schedule;
one or more communication network condition measurements; and
sensor data.

Paragraph 9. A method according to any of paragraphs 2 to 8, wherein the context switch criteria are based on one or more of:
communication network parameters,
client device conditions,
sensor data, and
a topic associated with sensor data.

Paragraph 10. A method according to paragraph 9, wherein the communication network parameters comprise one or more of:
a registration status with a wireless communications network,
a technology associated with an available communications network,
an identity of an available communications network,
a signal strength measurement associated with an available communications network.

Paragraph 11. A method according to any of paragraphs 2 to 10, wherein the first connection is established using a first wireless communications network, and the second connection is established using a second wireless communications network.

Paragraph 12. A method according to any of paragraphs 2 to 11, the method comprising:
receiving at the messaging interface a request to transmit a ping request message comprising the identifier, wherein
the establishing with the message broker the second connection is in response to receiving the request to transmit the ping request message.

Paragraph 13. A method according to any of paragraphs 2 to 12, wherein the context switch criteria are irrespective of any request received via the messaging interface.

Paragraph 14. A method according to any of paragraphs 2 to 13, the method further comprising:
updating a virtual session state based on one or more transmissions via the first connection,
updating the virtual session state based on one or more transmissions via the second connection, and
providing, via the messaging interface, an indication of the virtual session state.

Paragraph 15. A method performed at a broker in a publish/subscribe messaging system, the method comprising:
establishing with a client a first connection for the transmission of published data in accordance with a first publish/subscribe messaging protocol, wherein the establishing comprises receiving from the client a connection request packet comprising an identifier of the client via a first communications network,
using the first connection for the transmission of first published data in accordance with the first publish/subscribe messaging protocol,
receiving from the client a connection request packet comprising an identifier of the client in accordance with a second publish/subscribe messaging protocol different from the first publish/subscribe messaging protocol,
establishing with the client a second connection for the transmission of published data in accordance with the second publish/subscribe messaging protocol different from the first publish/subscribe messaging protocol,
after the establishing the second connection, using the second connection for the transmission of second published data in accordance with the second publish/subscribe messaging protocol.

Paragraph 16. A method according to paragraph 15, the method comprising:
receiving from the client, according to one of the first and second messaging protocols, a subscription request, wherein the first published data and the second published data are within the scope of the subscription request, and
receiving the first published data and the second published data from another client.

Paragraph 17. A method according to paragraph 15, wherein the first published data is first data transmitted by the client and the second published data is second data transmitted by the client, the method further comprising:
receiving a subscription request from another client, wherein the first published data and the second published data are within the scope of the subscription request,
transmitting the first published data and the second published data to the other client in accordance with the subscription request.

Paragraph 18. A method according to any of paragraphs 1 to 17, wherein the first publish/subscribe messaging protocol is selected from a first group of protocols comprising MQTT version 5.0, MQTT version 3.1.1 and updated versions of these, and
the second publish/subscribe messaging protocol is selected from a second group of protocols comprising MQTT-SN version 1.2, MQTT-SN version 2.0, and updated versions of these.

Paragraph 19. An apparatus, comprising:
a network interface,
a processor, and
a memory, the memory having stored upon it instructions which, when executed, cause the apparatus to carry out the method of any of paragraphs 1 to 18.

Paragraph 20. A computer program comprising instructions which, when the program is executed by a processor, cause an apparatus to carry out the method of any of paragraphs 1 to 18.

Paragraph 21. A computer readable medium comprising instructions which, when executed by a processor, cause an apparatus to carry out the method of any of paragraphs 1 to 18.

The invention claimed is:

1. A method performed at a client in a publish/subscribe messaging system, the method comprising:
establishing with a message broker a first connection for the communication of published data between the client and the message broker in accordance with a first publish/subscribe messaging protocol, wherein the establishing comprises transmitting a connection request packet comprising an identifier of the client via a first communications network,
using the first connection for the transmission of first published data in accordance with the first publish/subscribe messaging protocol,
determining that one or more criteria for using a second publish/subscribe messaging protocol in preference to the first publish/subscribe messaging protocol are satisfied, the second publish/subscribe messaging protocol being different from the first publish/subscribe messaging protocol, wherein the first publish/subscribe messaging protocol is MQTT deployed across transmission control protocol over internet protocol and the second publish/subscribe messaging protocol is MQTT-SN deployed across a connectionless transport protocol,
establishing with the message broker a second connection for the communication of published data between the client and the message broker in accordance with the second publish/subscribe messaging protocol, and
after the determining, using the second connection for the transmission of second published data in accordance with the second publish/subscribe messaging protocol, wherein the criteria are dependent on communication network parameters comprising one or more of:
- a registration status with a wireless communications network,
- a technology associated with an available communications network,
- an identity of an available communications network, and
- a signal strength measurement associated with an available communications network.

2. A method according to claim 1, the method further comprising:
- transmitting, according to one of the first and second messaging protocols, a subscription request, wherein the first published data and the second published data are within the scope of the subscription request.

3. A method according to claim 1, wherein the first published data is first data received at a messaging interface and the second published data is second data received at the messaging interface.

4. A method according to claim 1, wherein the selected network profile defines one or more of:
- one or more cellular network operators;
- one or more communication network technologies;
- one or more transport layer protocols; and
- one or more transport layer security protocols.

5. A method according to claim 1, wherein the determining comprises performing a context assessment in response to a determination that sensor data is to be transmitted or in response to one or more trigger criteria being satisfied, the trigger criteria being based on one or more of:
- a pre-determined schedule;
- one or more communication network condition measurements; and
- sensor data.

6. A method according to claim 1, wherein the criteria are further based on one or more of:
- client device conditions,
- sensor data, and
- a topic associated with sensor data.

7. A method according to claim 1, wherein the first connection is established using a first wireless communications network, and the second connection is established using a second wireless communications network.

8. A method according to claim 1, the method comprising:
- receiving at the messaging interface a request to transmit a ping request message comprising the identifier, wherein
- the establishing with the message broker the second connection is in response to receiving the request to transmit the ping request message.

9. A method according to claim 1, wherein the criteria are irrespective of any request received via the messaging interface.

10. A method according to claim 1, the method further comprising:
- updating a virtual session state based on one or more transmissions via the first connection,
- updating the virtual session state based on one or more transmissions via the second connection, and
- providing, via the messaging interface, an indication of the virtual session state.

11. A method according to claim 1, wherein the first publish/subscribe messaging protocol is selected from a first group of protocols comprising MQTT version 5.0, MQTT version 3.1.1, and the second publish/subscribe messaging protocol is selected from a second group of protocols comprising MQTT-SN version 1.2, MQTT-SN version 2.0.

12. A method performed at a broker in a publish/subscribe messaging system, the method comprising:
- establishing with a client a first connection for the communication of published data between the client and the message broker in accordance with a first publish/subscribe messaging protocol, wherein the establishing comprises receiving from the client a connection request packet comprising an identifier of the client via a first communications network,
- using the first connection for the transmission of first published data in accordance with the first publish/subscribe messaging protocol,
- receiving from the client a connection request packet comprising an identifier of the client in accordance with a second publish/subscribe messaging protocol different from the first publish/subscribe messaging protocol responsive to the client determining that one or more criteria for using a second publish/subscribe messaging protocol in preference to the first publish/subscribe messaging protocol are satisfied, the second publish/subscribe messaging protocol being different from the first publish/subscribe messaging protocol, wherein the first publish/subscribe messaging protocol is MQTT deployed across transmission control protocol over internet protocol and the second publish/subscribe messaging protocol is MQTT-SN deployed across a connectionless transport protocol,
- establishing with the client a second connection for the communication of published data between the client and the message broker in accordance with the second publish/subscribe messaging protocol,
- after the establishing the second connection, using the second connection for the transmission of second published data in accordance with the second publish/subscribe messaging protocol, wherein the criteria are dependent on communication network parameters comprising one or more of:
- a registration status with a wireless communications network,
- a technology associated with an available communications network,
- an identity of an available communications network, and
- a signal strength measurement associated with an available communications network.

13. A method according to claim 12, the method comprising:
- receiving from the client, according to one of the first and second messaging protocols, a subscription request, wherein the first published data and the second published data are within the scope of the subscription request, and
- receiving the first published data and the second published data from another client.

14. A method according to claim 12, wherein the first published data is first data transmitted by the client and the second published data is second data transmitted by the client, the method further comprising:
- receiving a subscription request from another client, wherein the first published data and the second published data are within the scope of the subscription request,
- transmitting the first published data and the second published data to the other client in accordance with the subscription request.

15. A client apparatus for a publish/subscribe messaging system, the client comprising:
- a network interface,
- a processor, and
- a memory, the memory storing instructions which, when executed, cause the client apparatus:

to establish with a message broker a first connection for the communication of published data between the client apparatus and the message broker in accordance with a first publish/subscribe messaging protocol, wherein the establishing comprises transmitting a connection request packet comprising an identifier associated with the apparatus via a first communications network, to use the first connection for the transmission of first published data in accordance with the first publish/subscribe messaging protocol,

- to determine that one or more criteria for using a second publish/subscribe messaging protocol in preference to the first publish/subscribe messaging protocol are satisfied, the second publish/subscribe messaging protocol being different from the first publish/subscribe protocol, wherein the first publish/subscribe messaging protocol is MQTT deployed across transmission control protocol over internet protocol and the second publish/subscribe messaging protocol is MQTT-SN deployed across a connectionless transport protocol,
- to establish with the message broker a second connection for the communication of published data between the client apparatus and the message broker in accordance with the second publish/subscribe messaging, and after the determining, to use the second connection for the transmission of second published data in accordance with the second publish/subscribe messaging protocol, wherein the criteria are dependent on communication network parameters comprising one or more of:
- a registration status with a wireless communications network,
- a technology associated with an available communications network,
- an identity of an available communications network, and
- a signal strength measurement associated with an available communications network.

16. The client apparatus of claim 15, wherein the first publish/subscribe messaging protocol is selected from a first group of protocols comprising MQTT version 5.0, MQTT version 3.1.1 and updated versions of these, and
  wherein the second publish/subscribe messaging protocol is selected from a second group of protocols comprising MQTT-SN version 1.2, MQTT-SN version 2.0, and updated versions of these.

17. The method of claim 12, wherein the first publish/subscribe messaging protocol is selected from a first group of protocols comprising MQTT version 5.0, MQTT version 3.1.1 and updated versions of these, and
  wherein the second publish/subscribe messaging protocol is selected from a second group of protocols comprising MQTT-SN version 1.2, MQTT-SN version 2.0, and updated versions of these.

* * * * *